United States Patent
Bickerstaff et al.

(10) Patent No.: US 10,187,633 B2
(45) Date of Patent: Jan. 22, 2019

(54) HEAD-MOUNTABLE DISPLAY SYSTEM

(71) Applicant: Sony Interactive Entertainment Europe Limited, London (GB)

(72) Inventors: Ian Henry Bickerstaff, London (GB); Sharwin Winesh Raghoebardajal, London (GB); Simon Mark Benson, London (GB)

(73) Assignee: Sony Interactive Entertainment Europe Limited (GB)

( * ) Notice: Subject to any disclaimer, the term of this patent is extended or adjusted under 35 U.S.C. 154(b) by 0 days.

(21) Appl. No.: 15/014,170

(22) Filed: Feb. 3, 2016

(65) Prior Publication Data
    US 2016/0234482 A1    Aug. 11, 2016

(30) Foreign Application Priority Data
    Feb. 6, 2015    (GB) .................................. 1501985.4

(51) Int. Cl.
    *G09G 5/00*    (2006.01)
    *H04N 13/344*    (2018.01)
    (Continued)

(52) U.S. Cl.
    CPC ......... *H04N 13/344* (2018.05); *G02B 27/017* (2013.01); *G02B 27/0149* (2013.01);
    (Continued)

(58) Field of Classification Search
    CPC ............. H04N 13/044; H04N 13/0497; H04N 13/344; G06T 7/0081; G06T 7/0051;
    G02B 27/0172; G02B 27/0179; G02B 27/0149; G02B 2027/014; G02B 2027/0187; G02B 2027/0129; G02B 2027/0154
    (Continued)

(56) References Cited

U.S. PATENT DOCUMENTS 6,411,326 B1    6/2002    Tabata
6,449,309 B1    9/2002    Tabata
(Continued)

FOREIGN PATENT DOCUMENTS

CN    203480126 U    3/2014
CN    104023221 A    9/2014
(Continued)

OTHER PUBLICATIONS

Search Report for Application No. GB1501985.4 dated Aug. 3, 2015.
(Continued)

*Primary Examiner* — Jennifer Nguyen
(74) *Attorney, Agent, or Firm* — Lerner, David, Littenberg, Krumholz & Metlink, LLP

(57) ABSTRACT

A method of operation of a head mountable display (HMD) system, in which stereoscopic images are displayed with respect to a virtual display screen (VDS) position, is provided. The method includes setting a VDS position for a stereoscopic image for display in response to a depth parameter of a region of interest (ROI) in respect of the stereoscopic image for display. The method also includes generating the stereoscopic image for display having an image parallax appropriate to the VDS position set by the setting step.

14 Claims, 17 Drawing Sheets

(51) Int. Cl.
*G02B 27/01* (2006.01)
*H04N 13/398* (2018.01)
*G06F 3/01* (2006.01)
*H04N 13/366* (2018.01)
*H04N 13/239* (2018.01)
*H04N 13/128* (2018.01)

(52) U.S. Cl.
CPC ..... *G02B 27/0172* (2013.01); *G02B 27/0179* (2013.01); *G06F 3/011* (2013.01); *G06F 3/012* (2013.01); *H04N 13/128* (2018.05); *H04N 13/239* (2018.05); *H04N 13/366* (2018.05); *H04N 13/398* (2018.05); *G02B 2027/014* (2013.01); *G02B 2027/0129* (2013.01); *G02B 2027/0134* (2013.01); *G02B 2027/0154* (2013.01); *G02B 2027/0187* (2013.01)

(58) Field of Classification Search
USPC .......................................... 345/7, 8; 349/11
See application file for complete search history.

(56) References Cited

U.S. PATENT DOCUMENTS

| | | | |
|---|---|---|---|
| 8,705,177 B1 | 4/2014 | Miao | |
| 2010/0157433 A1 | 6/2010 | Mukawa et al. | |
| 2012/0026158 A1* | 2/2012 | Oto | H04N 13/0278 345/419 |
| 2012/0113092 A1 | 5/2012 | Bar-Zeev et al. | |
| 2012/0120200 A1* | 5/2012 | Newton | H04N 13/0003 348/46 |
| 2012/0123742 A1* | 5/2012 | Harrison | G02B 27/0012 703/1 |
| 2012/0212482 A1* | 8/2012 | Arai | G06F 3/04815 345/419 |
| 2014/0362180 A1 | 12/2014 | Bickerstaff et al. | |
| 2015/0061998 A1* | 3/2015 | Yang | G06F 3/04815 345/156 |
| 2016/0180498 A1* | 6/2016 | Kobayashi | G02B 27/0172 345/9 |
| 2016/0239252 A1* | 8/2016 | Nakagawa | G06F 3/012 |

FOREIGN PATENT DOCUMENTS

| | | |
|---|---|---|
| EP | 1564585 A1 | 8/2005 |
| EP | 1731943 A1 | 12/2006 |
| GB | 2512404 A | 10/2014 |
| JP | 2006185448 A | 7/2006 |
| WO | 2012166593 A2 | 12/2012 |
| WO | 2014155072 A2 | 10/2014 |
| WO | 2014156033 A1 | 10/2014 |

OTHER PUBLICATIONS

Search Report for Application No. GB1501985.4 dated Jan. 7, 2016.
Examination Report for Application No. 16152981.3, dated Jan. 30, 2018.
Extended European Search Report for EP 17 18 1355 dated Jan. 31, 2018.

* cited by examiner

LEFT  RIGHT

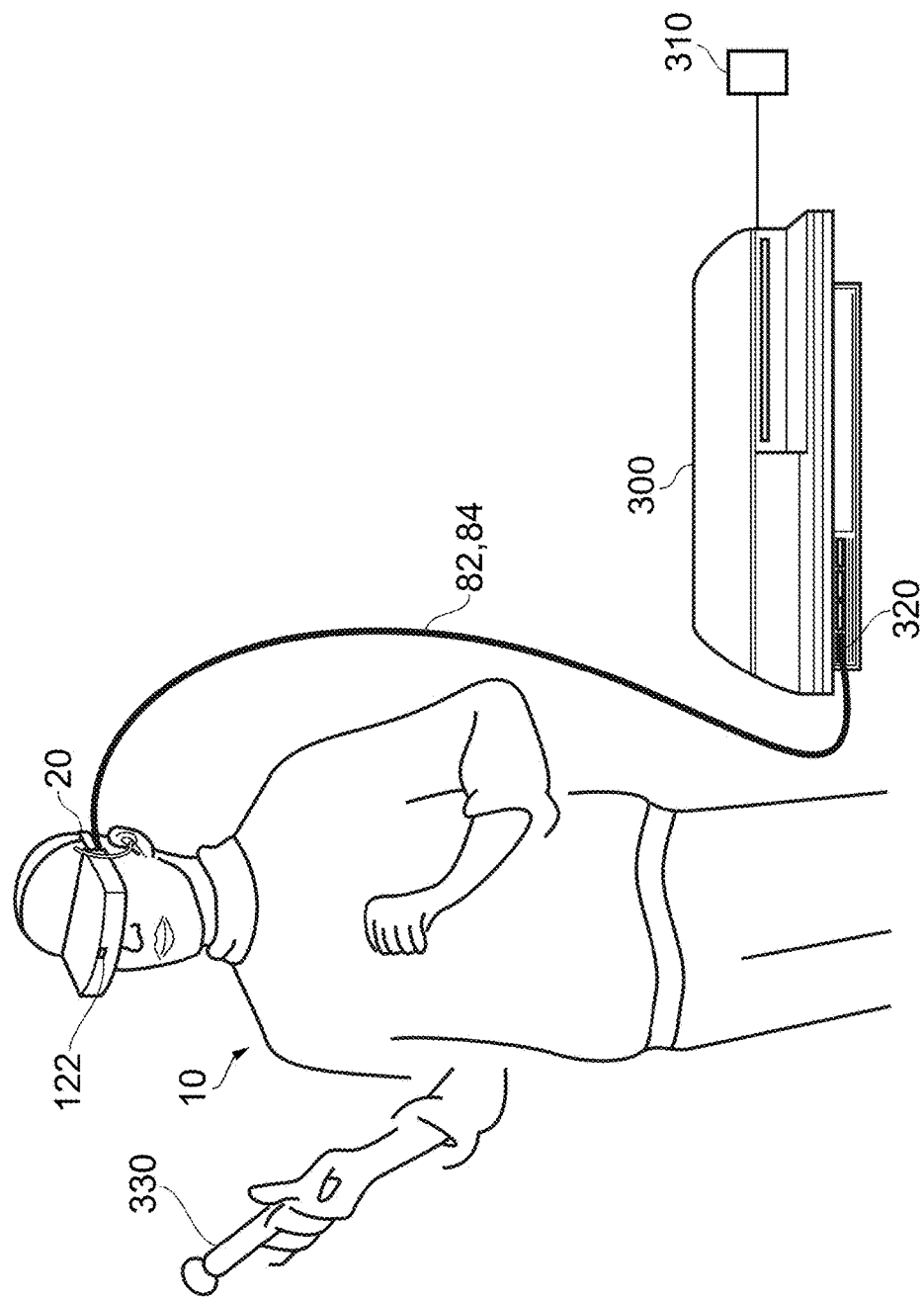

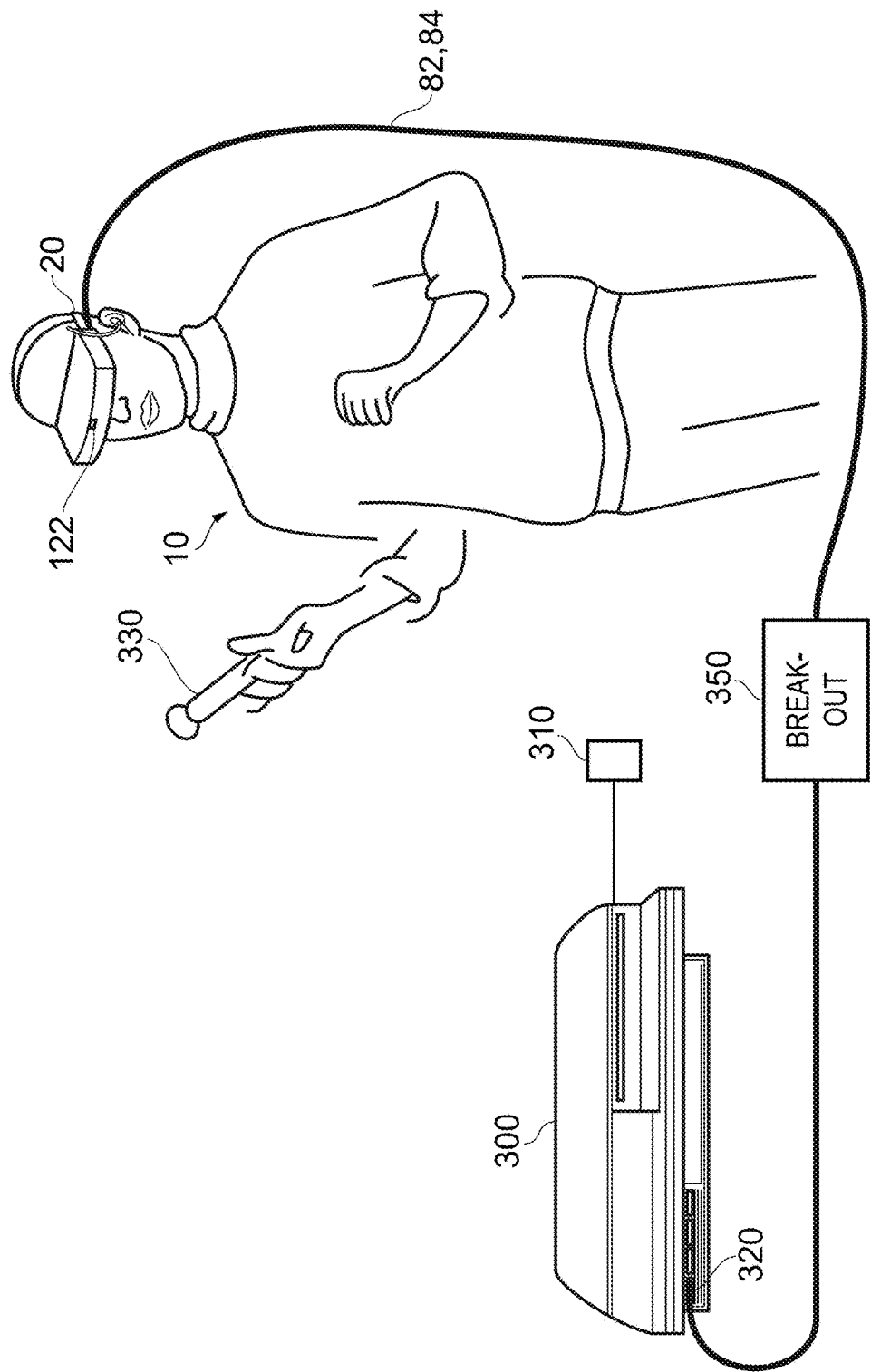

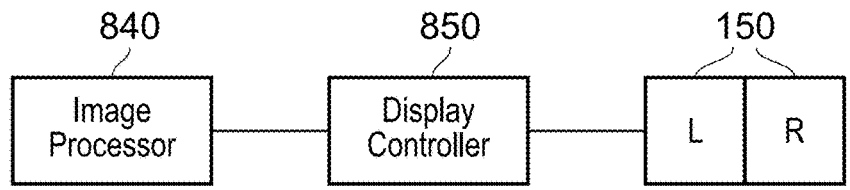
FIG. 26
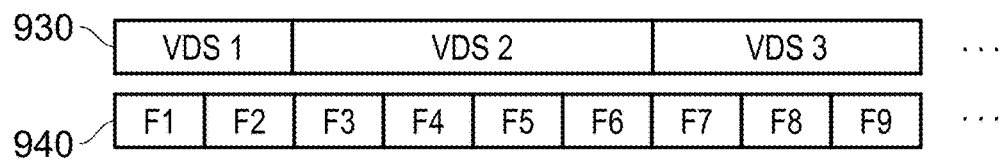
FIG. 28
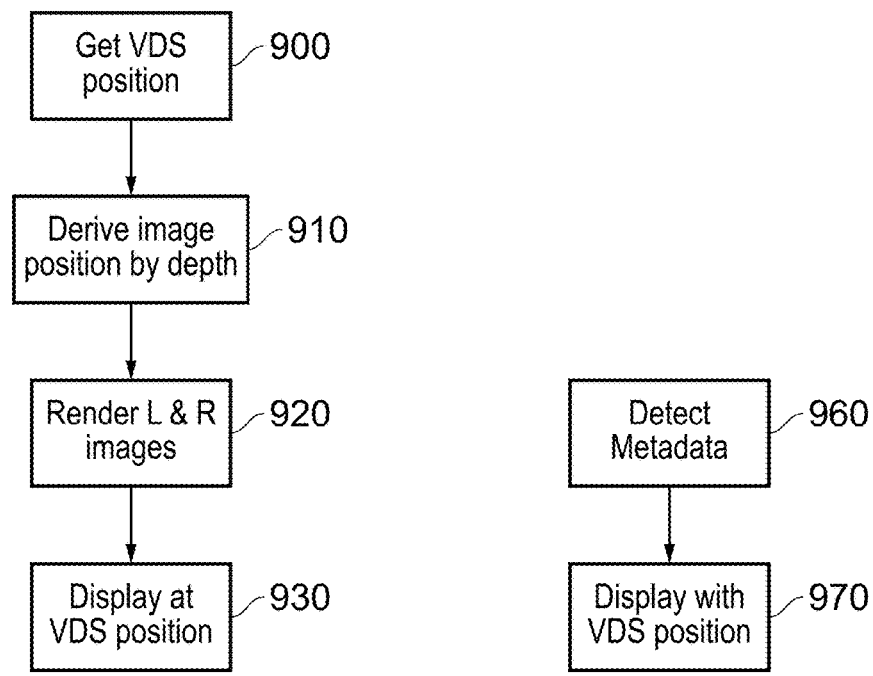
FIG. 27
FIG. 29

HEAD-MOUNTABLE DISPLAY SYSTEM

CROSS REFERENCE TO RELATED APPLICATIONS

The present application claims the benefit of and priority to GB Patent Application No. 1501985.4, filed Feb. 6, 2015, the entire disclosure of which is hereby incorporated by reference herein.

BACKGROUND

Field of the Disclosure

This disclosure relates to head-mountable display systems.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus. In an HMD, an image or video display device is provided which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimeters from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses or other optical components which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 6 and 7 schematically illustrate a user wearing an HMD connected to a Sony® PlayStation 3® games console;

FIG. 26 schematically illustrates an image processing device;

FIG. 27 is a schematic flowchart illustrating one example of the operation of the apparatus of FIG. 26;

FIG. 28 schematically illustrates video metadata;

FIG. 29 is a schematic flowchart illustrating video processing based on the metadata of FIG. 28;

DESCRIPTION OF THE EMBODIMENTS

Figure 1:
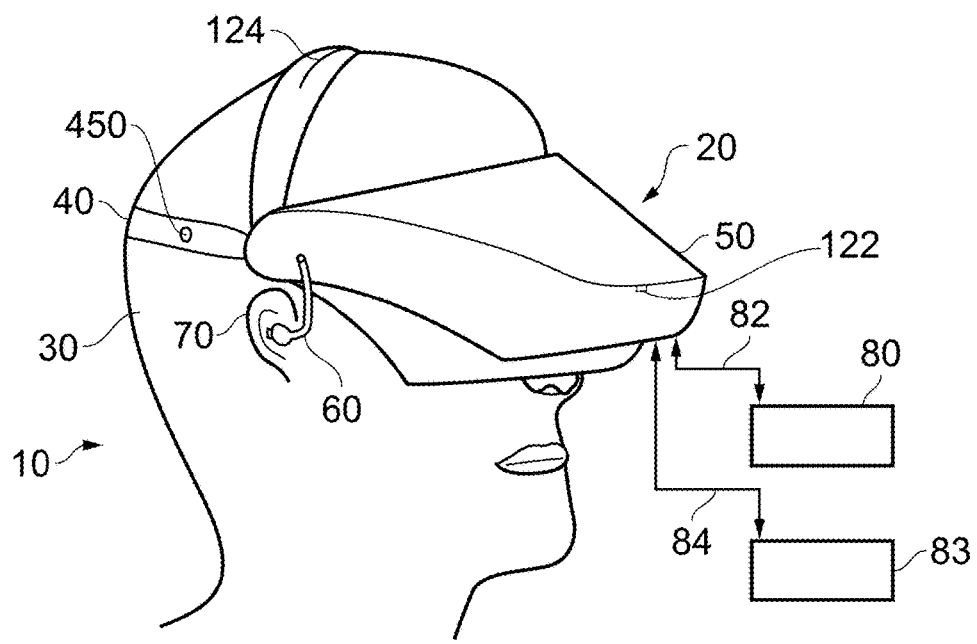
FIG. 1 schematically illustrates an HMD worn by a user.

Referring now to FIG. 1, a user 10 is wearing an HMD 20 (as an example of a generic head-mountable apparatus). The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
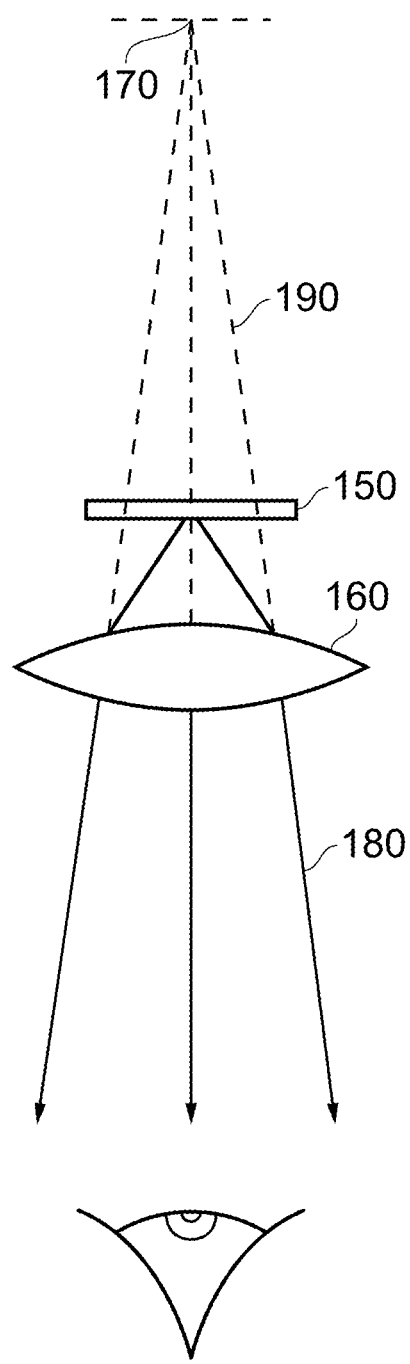
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several meters. In FIG. 3, solid lines (such as the line 180) are used to denote real optical rays, whereas broken lines (such as the line 190) are used to denote virtual rays.

Figure 4:
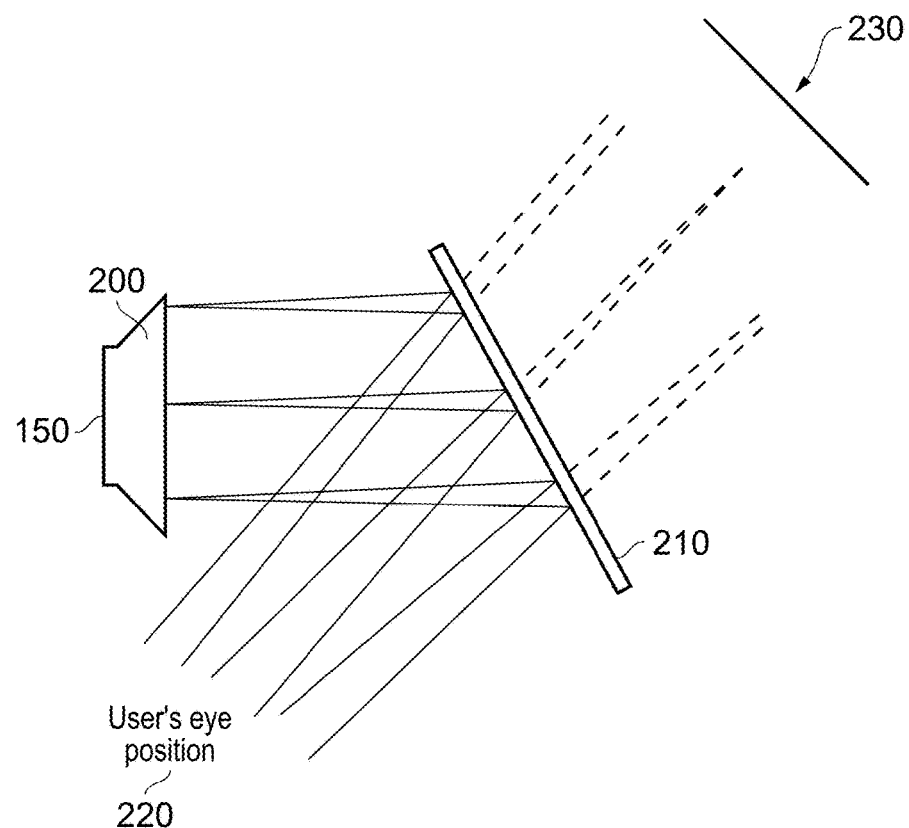
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

FIG. 6 schematically illustrates a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84. In FIG. 6, the user is also shown holding a hand-held controller 330 which may be, for example, a Sony® Move® controller which communicates wirelessly with the games console 300 to control (or to contribute to the control of) game operations relating to a currently executed game program.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

FIG. 7 schematically illustrates a similar arrangement in which the games console is connected (by a wired or wireless link) to a so-called "break out box" acting as a base or intermediate device 350, to which the HMD 20 is connected by a cabled link 82,84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
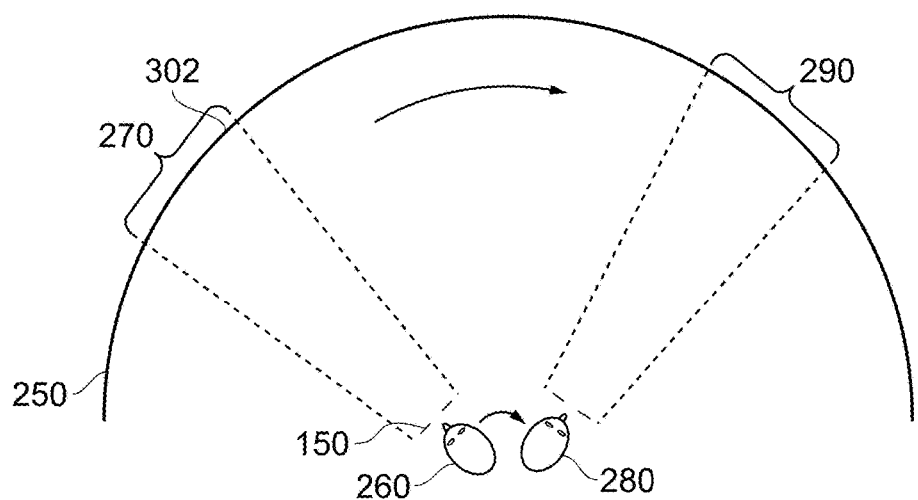
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. This provides an example of a virtual display screen (VDS). Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD. It can be seen from the drawing that the VDS subsists in three dimensional space (in a virtual sense) around the position in space of the HMD wearer, such that the HMD wearer sees a current portion of VDS according to the HMD orientation.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
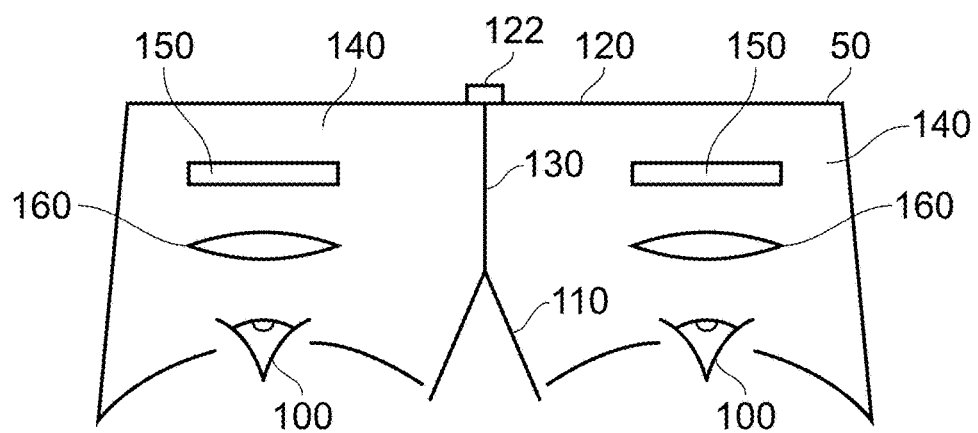
FIG. 2 is a schematic plan view of an HMD.
Figure 9A:
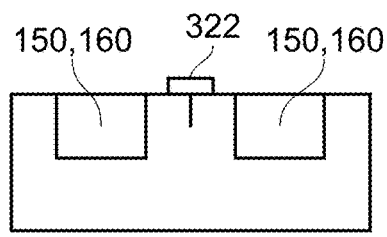
FIGS. 9a and 9b schematically illustrate HMDs with motion sensing.
Figure 9B:
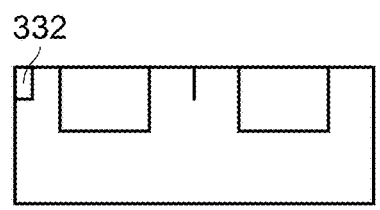

FIGS. 9*a* and 9*b* schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9*a*, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9*b* makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
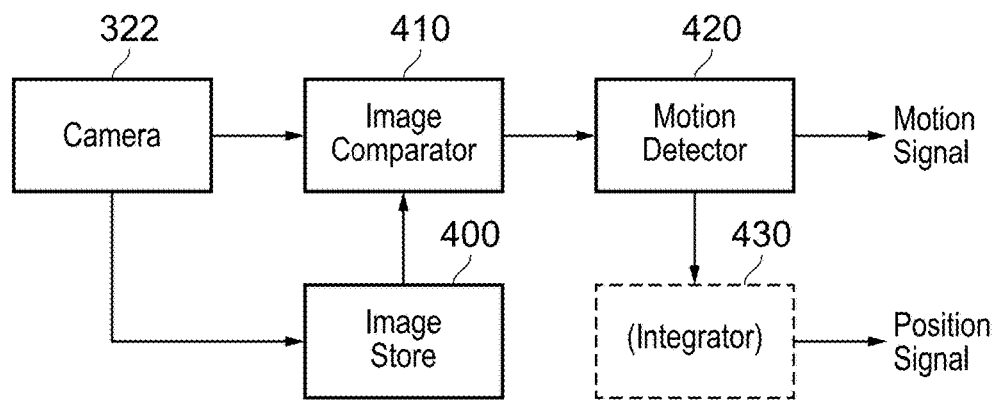
FIG. 10 schematically illustrates a position sensor based on optical flow detection.

FIG. 10 schematically illustrates one example of motion detection using the camera 322 of FIG. 9*a*.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
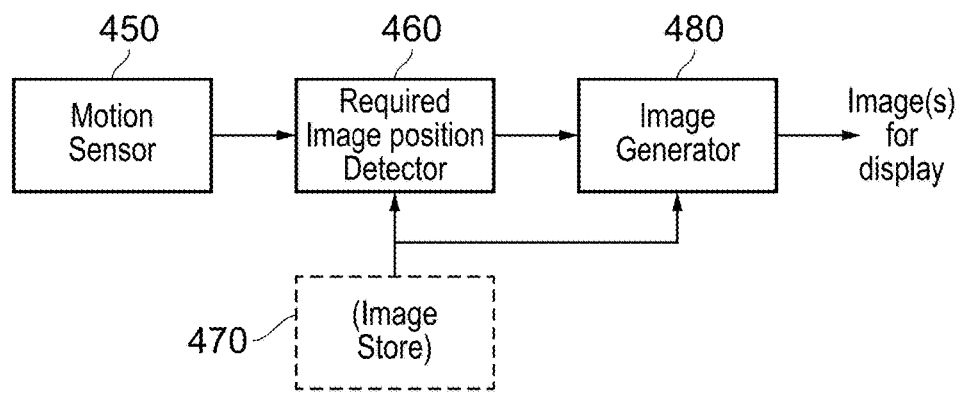
FIG. 11 schematically illustrates the generation of images in response to HMD position or motion detection.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9*b*) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

Figure 12:
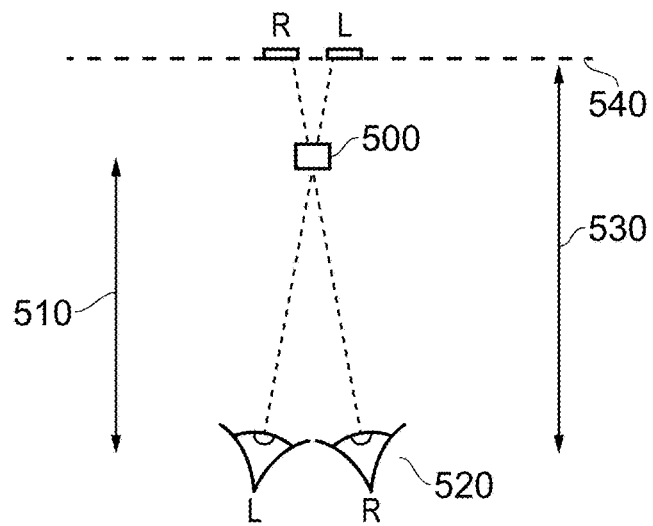
FIGS. 12 to 14 schematically illustrate the relationship between the presentation of apparent depth in a 3D representation of an object.
Figure 13:
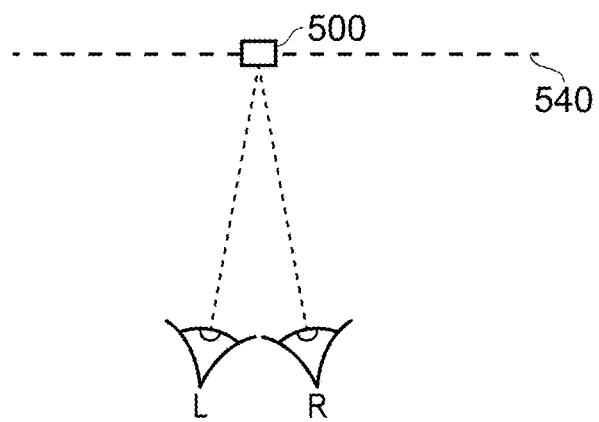
Figure 14:
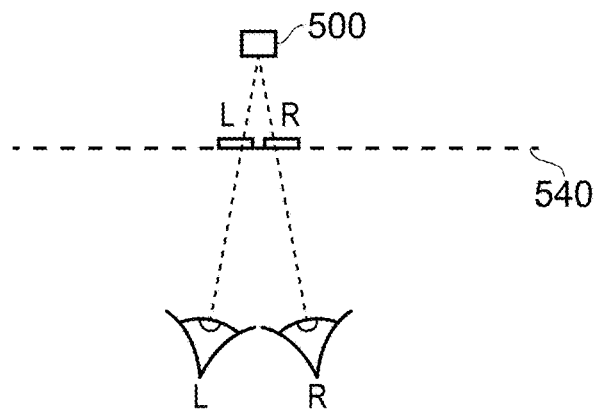

FIGS. 12-14 schematically illustrate the relationship between the presentation of apparent depth in a 3D representation of an object 500 at a distance 510 from the viewer's eyes 520 and the separation 530 of a display screen position 540 from the viewer's eyes.

In each of FIGS. 12-14 the object 500 is at the same distance 510 from the viewer's eyes but the separation of the display screen position 540 from the viewer's eyes varies between the three drawings.

The ideal separation of the display screen from the viewer depends upon properties of the camera system by which a 3D image is captured, and in particular relates to the distance from the camera of a so-called zero disparity point (ZDP), which is a position with respect to the camera at which the optical axes of the left and right image cameras converge. For an authentic representation of a 3D scene, the display screen should be placed at the same distance from the viewer as the ZDP of the camera system. So the two aspects are inter-related in that the convergence of the cameras can be set to provide a ZDP at a distance corresponding to the expected viewer-to-screen separation. For example, in the case of 3D material prepared for display on a television set, a typical viewer-to-television set distance may be assumed.

Referring to FIG. 12, the position of the object 500 to be represented is in front of the display screen position 540. In order to provide a 3D representation of the object 500, respective left and right ("L" and "R") images (together forming a respective stereoscopic image for display) are displayed on the display screen with a parallax depending on the depth of the object to be displayed. In order to represent an object in front of the display screen (which is the situation for the object 500 in FIG. 12), the parallax of the left and right images is reversed, which is to say that the left image is displayed to the right side of the right image. When the left image is viewed by the left eye only and the right image is viewed by the right eye only the impression given to the viewer is that of an object 500 at the distance 510 from the viewer, or in other words in front of the display screen.

FIG. 13 schematically illustrates the situation where the object 500 is at the same distance from the viewer as the display screen position 540. Here, there is no parallax or disparity between the left and right images of that object 500.

FIG. 14 schematically illustrates the situation where the object 500 is behind the position of the display screen (which is to say, further away from the viewer than the display screen position). In this situation, disparity is again used to provide the 3D representation of the position in space of the object 500, but in contrast to FIG. 12, the left and right images are not reversed with respect to one another, which is to say that the left image is displayed to the left side of the right image.

Overall, it can be seen from FIGS. 12-14 that, for an identical viewer position and an identical viewer-object 500 distance (510), the object 500 can be represented on a 3D display using various different display screen positions. Note that each of FIGS. 12-14 can provide an authentic and correct representation of the depth 510 of the object 500. The aspects which vary between FIGS. 12, 13 and 14 are the viewer-to-screen separation and (in a related way) the disparity, which is to say, the left-right separation (and separation direction) of the left and right images. If the object 500 is in front of the display screen, the left and right images are displayed with disparity but in a reverse direction. If the object 500 is at the same separation as the display screen, there is no disparity in the left and right images of the object 500. If the object 500 is behind the display screen, the left and right images are displayed with disparity.

In the example mentioned above, the images were captured using a camera system in which the separation from the viewer (or from the camera) of the ZDP was defined by the convergence of the optical axes of the left and right cameras. In the examples to be discussed below, however, the separation of the ZDP from the viewer can be changed. Some examples relate to computer-generated images in which the position of the ZDP can be altered during generation of the images, but other examples to post-processing of captured or previously generated 3D images in order to vary the location of the ZDP.

Changing the position of a 3D display screen has particular significance in the context of head mountable displays (HMDs). In the context of a conventional (non-HMD) display screen such as a television set or a cinema screen, it is not particularly practical to vary the separation of the user and the display screen, particularly during presentation of a piece of content. But an HMD can make use of a "virtual display screen" position such that the separation from the viewer of the virtual display screen can be altered dynamically during presentation of a content item. FIGS. 15-18 provide a discussion of potential reasons, which have been recognised as part of the present disclosure, for why a variation of a viewer-virtual screen distance may be useful.

Figure 15:
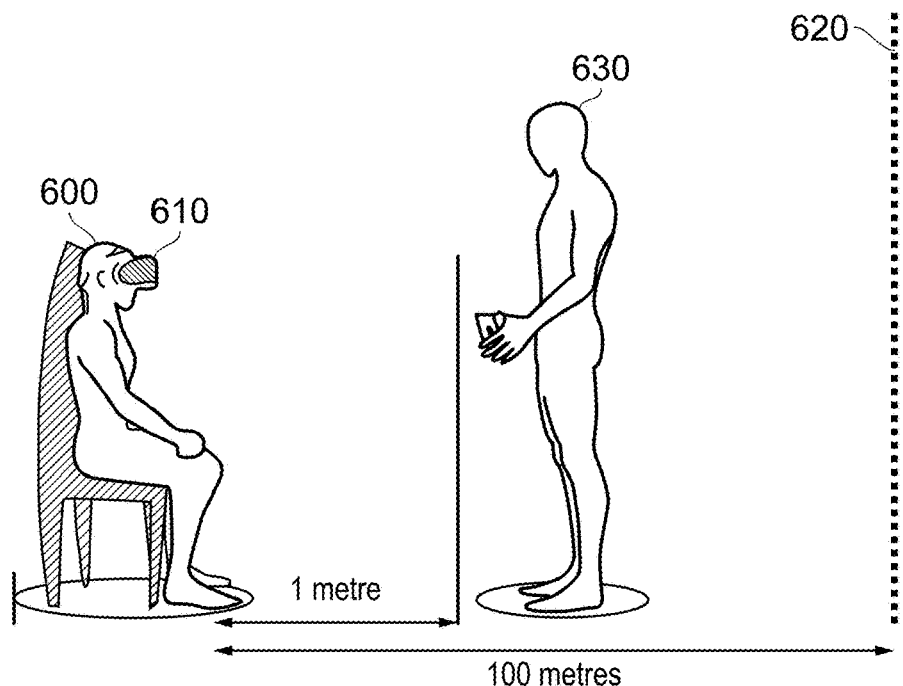
FIG. 15 provides a schematic example of a viewer wearing an HMD by which a virtual 3D display screen is displayed.

FIG. 15 provides a schematic example of a viewer 600 wearing an HMD 610 by which a virtual 3D display screen 620 is displayed. The virtual display screen is a virtual version of the display screen as discussed in connection with FIGS. 12-14. It is referred to as "virtual" because it does not physically exist in space, but rather is created or simulated optically by the operation of the HMD displays. But in other respects it fulfils the same function as the display screen discussed in connection with FIGS. 12-14. The mechanism by which a 3D virtual display screen is provided will be discussed further below. Note that as mentioned earlier, the virtual display screen subsists in three dimensional space (in a virtual sense) around the position in space of the HMD wearer, such that the HMD wearer sees a current portion of VDS according to the HMD orientation. The virtual display screen may be planar, part-spherical, curved or another shape.

For the sake of the example of FIG. 15, assume that the virtual display screen 620 is at an apparent distance of 100 meters from the viewer 600 (and is correspondingly very large). The 3D display arrangement is used to display an image of a character 630 at (for the sake of this example) 1 meter from the viewer 600. The character 630 is drawn at a position representing its apparent display position to the HMD wearer 600, but of course the character does not literally exist at that position in a physical form.

Figure 16:
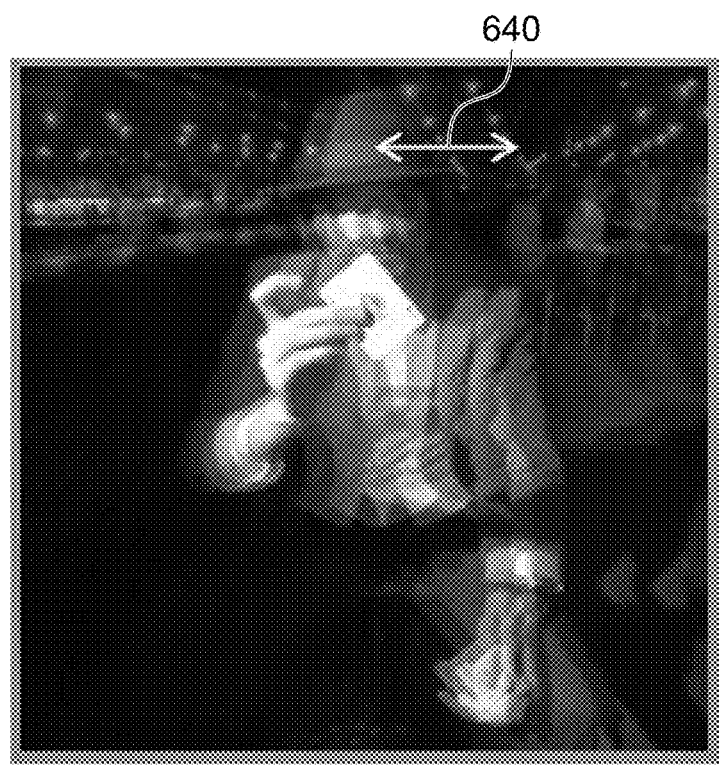
FIG. 16 provides a schematic example of image disparity.

As discussed above with reference to FIG. 12, the character 630 is in front of the display screen position and so the left and right images of the character 630 exhibit left-to-right disparity in which the left eye image is displaced to the right side of the right eye image. FIG. 16 provides a schematic example of this disparity 640.

Again, as discussed above with reference to FIGS. 12-14, it is of course fully possible to display the character 630 in front of the display screen 620 using the correct amount of left-to-right disparity in the left and right images.

Figure 17:
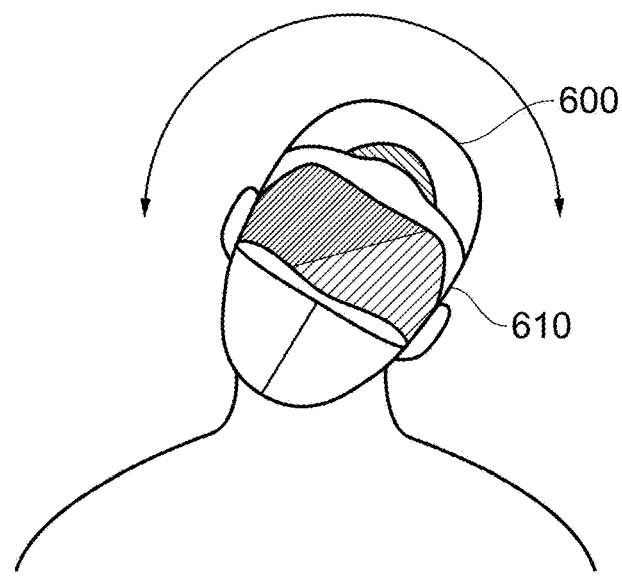
FIG. 17 schematically illustrates a tilted head.
Figure 18:
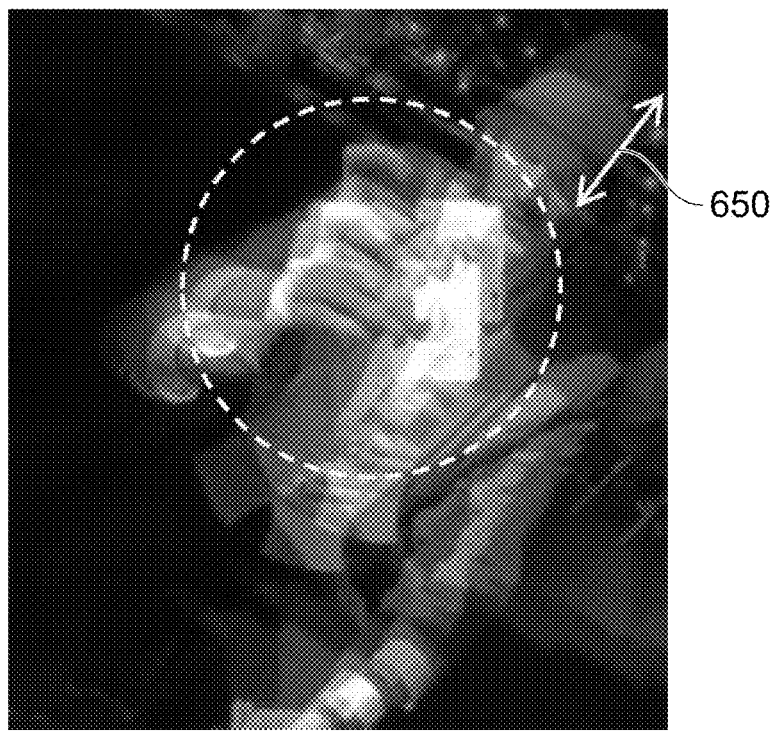
FIG. 18 schematically illustrates an example of a vertical component of parallax.

A particular problem, relevant primarily to HMDs, is illustrated in FIGS. 17 and 18. The problem arises in a situation in which the user tilts his or her head to one side or the other. A tilted head is shown schematically in FIG. 17. Now, the parallax in the video no longer corresponds with the viewer's eye orientation. The viewer sees vertical components of the parallax and the image is subjectively uncomfortable to view. An example of a vertical component of parallax is illustrated schematically as parallax 650 in FIG. 18.

A solution provided by the present disclosure is to adjust the parallax in the displayed images using (for example) a horizontal image translation so that the main image subject or region of interest (in this example, the character 630) has zero parallax. This will also lead to a corresponding but opposite change to parts of the image having a depth position different to that of the main subject. In order to provide a correct representation of the 3D scene, the virtual display screen 620 is also moved so that its separation from the viewer 600 is the same as that of the subject 630. Accordingly, the display of the character 630 is changed from the situation of FIG. 12 to the situation of FIG. 13 by the two operations of (a) moving the position of the display screen (in this case, a virtual display screen) to the depth of the character 630 and (b) altering the parallax of displayed items to suit the new display screen position. This arrangement allows the viewer to be able to tilt his or her head and maintain a comfortable 3D view of the subject 630, as shown schematically in FIG. 19. In FIG. 20, a card 660 held by the character 630 exhibits zero parallax.

Figure 19:
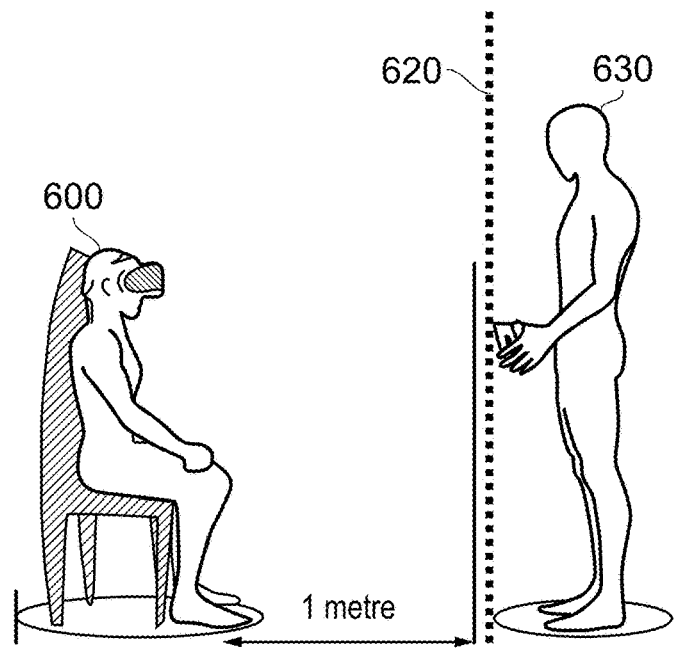
FIG. 19 schematically illustrates a virtual display screen repositioned to align with an object or region of interest.
Figure 20:
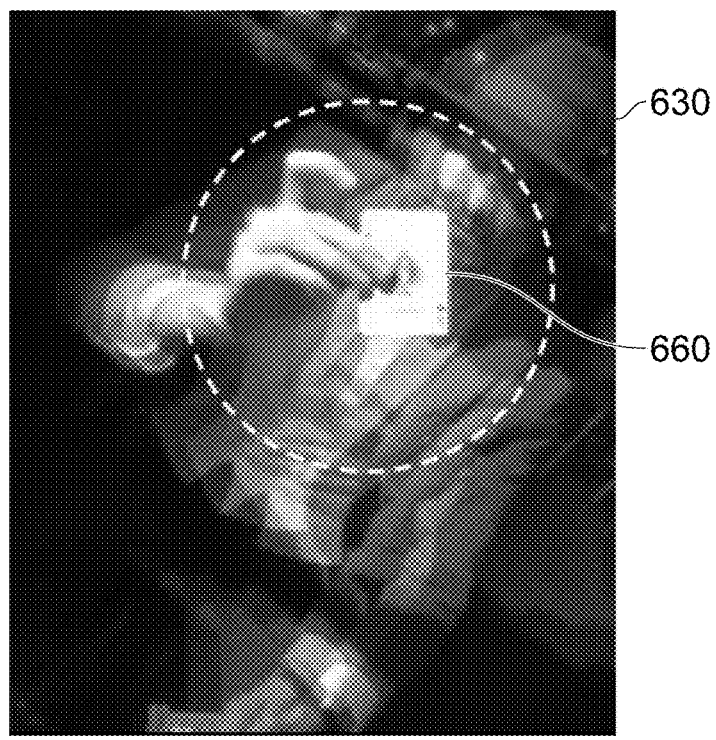
FIG. 20 provides a schematic example of image disparity.

Comparing FIG. 19 with FIG. 15, note that when the viewer's head is horizontal, the 3D image will appear entirely identical between the two situations. In other words, when the head is horizontal, there is no difference between the version with the virtual screen at 100 meters from the viewer and the version with the virtual screen 1 meter from the viewer. Both arrangements provide an equally authentic representation of the 3D scene. But if the user tilts his or her head during viewing, the version of FIG. 19 with the virtual screen at the same distance (or substantially the same distance) from the viewer as the main region of interest in the displayed content, will be subjectively much more comfortable to view.

Figure 22:
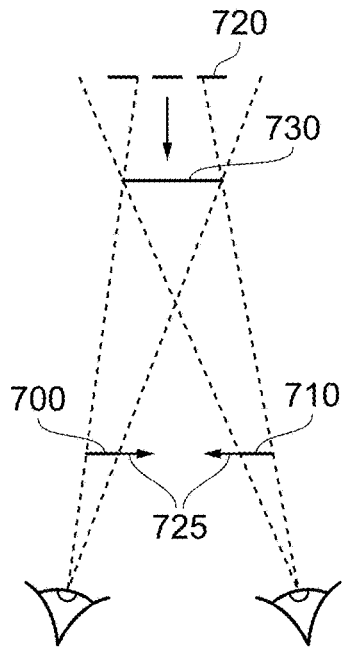
Figure 23:
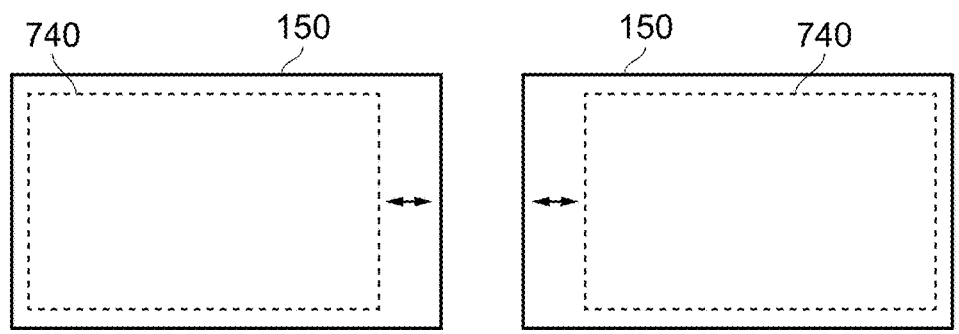

Techniques for changing the parallax of a 3D image for display will be discussed below. First, however, FIGS. 21-23 schematically illustrate the generation of a virtual display screen in an HMD.

Referring back to FIG. 3, in the context of an HMD it is possible even with display devices which are physically very close to the user's eye to give the impression of a virtual image some considerable distance from the user. This is important for user comfort, because even if the user could focus his eyes on a display device a matter of a few cm from the eye (and most users simply could not do this) it would be very uncomfortable to maintain that level of close focus over a prolonged period. So, in optical terms, the virtual image provided by the display optics is at a comfortable distance from the viewer's eyes. But that discussion relates to the focus distance of the viewer's eyes. The position in space of a virtual display screen for 3D presentation can be different to the distance at which the eyes have to focus on the optical virtual image of the display devices. In fact, the separation from the user of a virtual display screen for 3D presentation depends on the bulk lateral disparity of the left and right displayed images.

Figure 21:
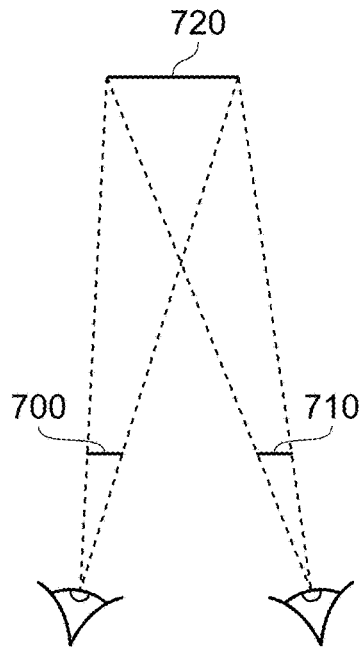
FIGS. 21 to 23 schematically illustrate the generation of a virtual display screen in an HMD.

In the example of FIG. 21, the overlay between displayed images 700, 710 for the left and right eyes gives rise to a virtual display screen position 720. In FIG. 22, the display positions of the left and right images 700, 710 are displaced slightly inwards in respective directions 725. This leads to a virtual display screen position moving towards the user to a new position 730.

So, a (potentially very slight) lateral adjustment of the position of the displayed images inwards (towards the other eye's image) brings the virtual display screen position towards the user. Lateral adjustment of the displayed image positions outwards (in a direction away from the other image) move the virtual display screen position away from the user. Note that these changes in the separation, from the user, of the virtual display screen for 3D presentation are independent of the focus distance of the eye on the optical virtual image provided by the display elements and the display optics. The focus distance can remain the same but the position, relative to the user, of the virtual display screen 720, 730 can be changed in this way.

It is possible to vary the lateral position of the displayed left and right images without any mechanical changes in the position of either the display devices 150 or the display optics 160, simply by providing display devices 150 which are slightly larger than the required size 740 of the displayed left and right images. This gives the scope to make subtle electronic changes to the position of the virtual display screen by simply laterally shifting the position, within the available display area of the display devices 150, of the displayed portion 740.

Figure 24:
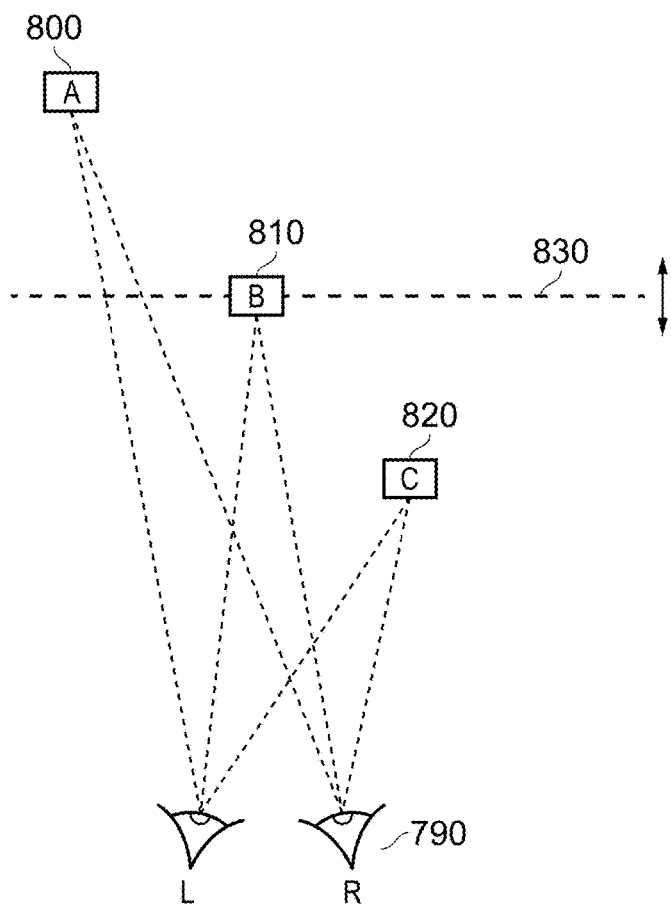
FIGS. 24 and 25 schematically illustrate the process of rendering 3D left and right images based on depth information of image features.
Figure 25:
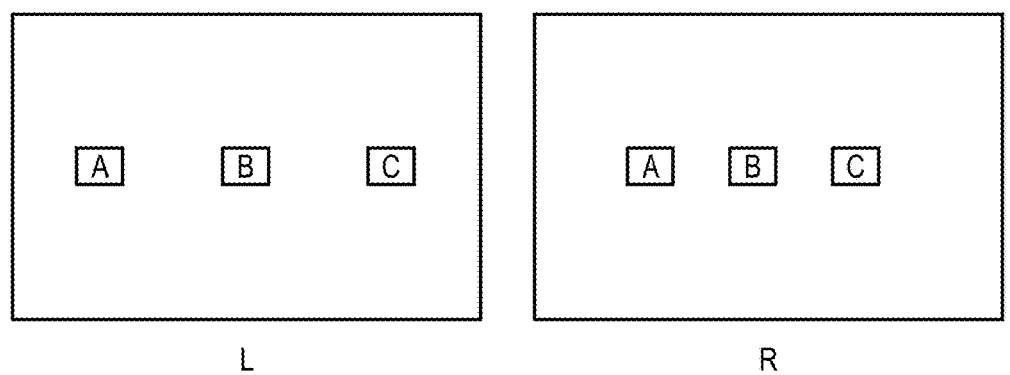

FIGS. 24 and 25 schematically illustrate the process of rendering 3D left and right images based on depth information of image features. The depth information may be provided by, for example, a depth parameter associated with pixel positions or objects for rendering. Such techniques are used in for example computer games systems in which various items relating to the ongoing progress and display of a computer game's virtual world have associated depth parameters relating to their virtual position in the virtual world.

In particular, FIG. 24 schematically illustrates left and right viewing positions 790, three example objects 800, 810, 820 at different depths and lateral positions with respect to the viewing positions 790, and the ZDP representing a virtual screen position 830. For each of the left and right images (labelled as "L" and "R" in FIG. 25) the image position of each of the objects 800 ... 820 in the respective image is determined according to their positions as seen from the viewpoint of that eye. Example L and R images are shown in FIG. 25. In this example, the position 830 of the virtual screen coincides with the depth of the object 810 so there is zero lateral disparity between the image positions of the object 810 in the left and right images. The object 800 is behind the position 830 of the virtual screen, and so the image position of the object 800 is displaced to the left in the left image and the right in the right image. The object 820 is in front of the position 830 of the virtual screen and so the image position of the object 820 is displaced to the right in the left image and to the left in the right image.

But in general, given a ZDP location and depth parameters associated with image objects or pixels, the resulting L and R images are rendered using known techniques to provide an appropriate representation of depth when the L image is viewed by the left eye and the R image is viewed by the right eye.

FIG. 26 schematically illustrates an image processing device, including the display devices 150 of the HMD. The remainder of the apparatus of FIG. 26 may be implemented by processing provided on the HMD, in the break out box, in a separate data processing apparatus such as a games console, or in a distributive manner between these items, or wholly or in part by a networked or cloud processing resource. An image processor 840 generates images for display, and the display of those images is handled by a display controller 850. Therefore, FIG. 26 provides an example of a head mountable display (HMD) system in which stereoscopic images are displayed with respect to a virtual display screen (VDS) position, the system comprising: an image processor (such as the image processor 840 and the display controller 850) configured to set a VDS position for a stereoscopic image for display in response to a depth parameter of a region of interest (ROI) in respect of the stereoscopic image for display and to generate the stereoscopic image for display having image parallax appropriate to the VDS position set by the image processor. The HMD system may comprise a display arrangement such as the displays 150 configured to display the generated stereoscopic image to a wearer of the HMD.

The functionality of the image processor 840 and the display controller 850 could be performed by hardware, programmable hardware such as a field programmable gate array (FPGA) or an application specific integrated circuit (ASIC, software executing on a general purpose data processing apparatus, or combinations of these. In so far as the techniques are carried out, at least in part, in response to computer software, it will be appreciated that such software, and a storage or other providing medium (an example being a non-transitory machine-readable storage medium storing such software, such as a non-volatile memory, a magnetic disc or an optical disc) by which such software is provided, are also considered to represent embodiments of the present disclosure.

FIG. 27 schematically illustrates one example of the operation of the apparatus of FIG. 26. At a step 900, a virtual display screen (VDS) position is obtained. Further discussion will be provided below as to how the VDS position is actually obtained, but for now (that is, for the purposes of the discussion of FIG. 27) it is sufficient to assume that an appropriate VDS depth with respect to the viewer has been obtained or derived. The obtained VDS position is set as a VDS position of a stereoscopic image for display.

At a step 910, the image position in each of the left and right images of each image feature is derived according to the position, with respect to the viewer, of the VDS, taking the VDS position as the ZDP for the purposes of deriving the parallax applicable to each image feature according to the depth of that image feature. At a step 920, respective left and right images are rendered by the image processor 840, and at a step 930 the left and right images are displayed by the display controller and the display elements 150 of the HMD based on the VDS position obtained at the step 900.

The steps 910, 920 may correspond, for example, to the process discussed above in connection with FIGS. 24 and 25. the step 920 provides an example of rendering the stereoscopic image for display having image parallax appropriate to the VDS position set by the VDS setting step.

The VDS position may be obtained by analysis of image or game content, for example using techniques to be discussed below in connection with FIG. 32, but in other situations it may be provided by metadata associated with pre-prepared or pre-recorded video content. FIG. 28 provides an example of such metadata, in which successive video frames 940 are accompanied by metadata 950 providing a VDS value for successive subsets of one or more video frames. FIG. 28 therefore provides an example of a stereoscopic video signal having associated metadata defining a virtual display screen position for use in respect of subsets of frames of the stereoscopic video signal. A storage medium by which such a video signal is provided is also considered to represent an embodiment of the present disclosure. This arrangement assumes that the accompanying video frames 940 have their parallax appropriately set to match the VDS values in the associated metadata, so that a simplified flow chart of FIG. 29 can apply. In FIG. 29, at a step 960 the metadata associated with video frames for display is detected and, from that metadata, VDS values are obtained, as an example of detecting the depth parameter from metadata accompanying the stereoscopic image for display. At a step 970 the associated video frames are displayed with the VDS position defined by the metadata detected in the step 960.

Figure 30:
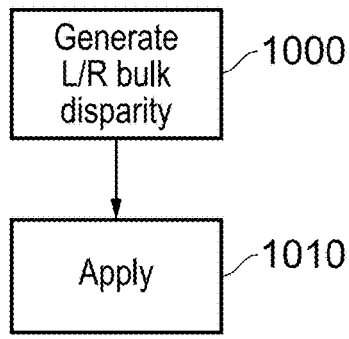
FIG. 30 is a schematic flowchart illustrating the positioning of a virtual display screen.

FIG. 30 is a schematic flow chart relating to the process discussed with reference to FIGS. 21-23 in which the VDS is established. At a step 1000, in response to a required VDS value, a parameter defining the appropriate left/right bulk image disparity is generated, and at a step 1010 the bulk disparity is applied as shown in FIG. 23, for example by varying the display position of a display portion 740 within the overall possible display area of a display element 150.

Figure 31:
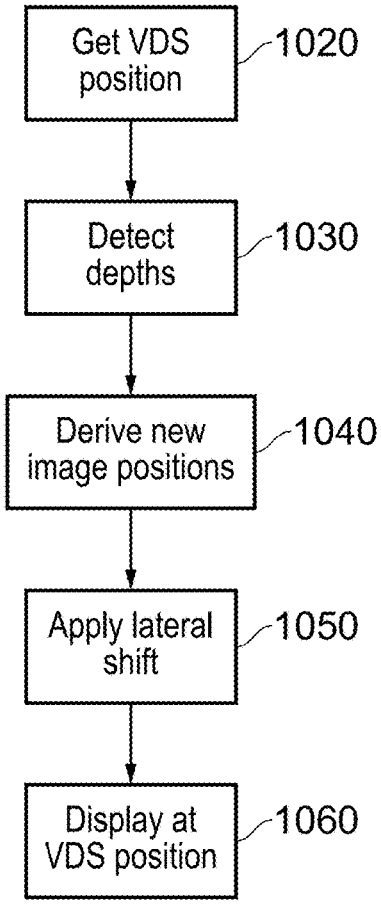
FIG. 31 is a schematic flowchart illustrating a video processing technique.

FIG. 31 is a schematic flow chart relating to the processing of already-prepared images such as captured video, pre-recorded video and the like.

At a step 1020 a VDS position is obtained, for example from accompanying metadata or from an image analysis process. Then, at a step 1030, depth information is derived from the already-obtained video material, for example from depth metadata associated with the video material and/or by analysis of parallax between similar image material (detected, for example, by a block correlation process) in each of the left and right images. At a step 1040, which is similar to the step 910 discussed above, new image positions for image items are derived according to their depth information and the VDS position obtained at the step 1020. At a step 1050, a lateral image shift is applied to any portions of image material which require lateral adjustment to move to their newly derived image positions (providing an example of image-shifting portions of a stereoscopic image to generate the stereoscopic image for display). Finally, at a step 1060 the adjusted video material is displayed at the VDS position obtained at the step 1020.

FIGS. 27, 29 and 31 therefore provide a set of examples of a method of operation of a head mountable display (HMD) system in which stereoscopic images are displayed with respect to a virtual display screen (VDS) position, the method comprising the steps of: setting a VDS position for a stereoscopic image for display in response to a depth parameter of a region of interest (ROI) in respect of the stereoscopic image for display; and generating the stereoscopic image for display having image parallax appropriate to the VDS position set by the setting step. The VDS position for the stereoscopic image for display may be set to be substantially equal to the depth represented by a depth parameter of the region of interest (ROI) in respect of the stereoscopic image for display.

Figure 32:
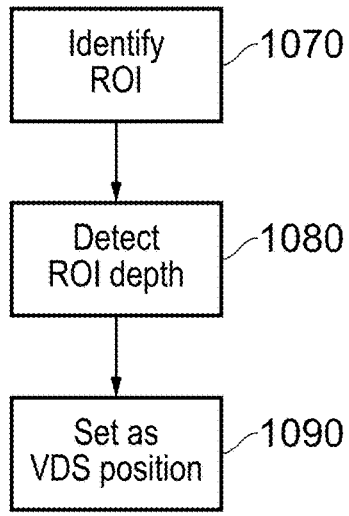
FIG. 32 is a schematic flowchart illustrating a process for identifying a virtual display screen position.

FIG. 32 is a schematic flow chart relating to the derivation of a VDS position, in situations where the VDS position is not provided by metadata such as that described with reference to FIG. 28. In FIG. 32, at a step 1070 a region of interest (ROI) is identified. For example, the ROI could be a region of the image relating to a main game character, avatar or feature (for example a moving car), as an example of detecting image content of the stereoscopic image for display so as to detect an ROI in respect of the stereoscopic image for display. Alternatively, the ROI could relate to a portion of the image which the viewer is currently looking at (for example, detected by one or more eye tracking camera(s) or from the bulk orientation of the HMD), or from a region in which the user is currently directing a cursor, or gunfire in a game situation, or the like, as an example of detecting a viewer gaze direction in respect of a preceding displayed stereoscopic image so as to detect an ROI in respect of the stereoscopic image for display. So, the ROI could be detected by an active detection step, or could simply be already established in, for example, a computer game system in which a main avatar represents the user as a game character. Similarly, the ROI in respect of an image may be derived from an already-rendered image, or a preceding displayed image such as an immediately-preceding displayed image (for example in the case of an eye or gaze tracking system) or may be apparent before the image for display is in fact rendered (for example in an avatar-based game situation).

At a step 1080, the depth parameters associated with the ROI are obtained. For example, in a computer game situation, each image item for display has associated depth parameters. Then, at a step 1090, that depth parameter is set as a new VDS position.

In some examples, it may be appropriate to apply a smoothing or low pass filtering process to avoid abrupt changes in the VDS, for example of greater than (say) a threshold virtual distance in a single frame period. If such a smoothing process is applied, it would form part of the step 1090.

Similarly (in fact in respect of any of the techniques described here) it is not necessarily required that the VDS position be set to exactly the depth of the ROI, particularly in instances where the ROI may not in fact correspond to a single depth parameter but may extend over a range of depths. The VDS position can be set to be substantially equal to the depth of the ROI (for example within 10% of the depth value of the ROI) or just to be nearer to the depth of the ROI than the VDS position was (before modification).

Figure 33:
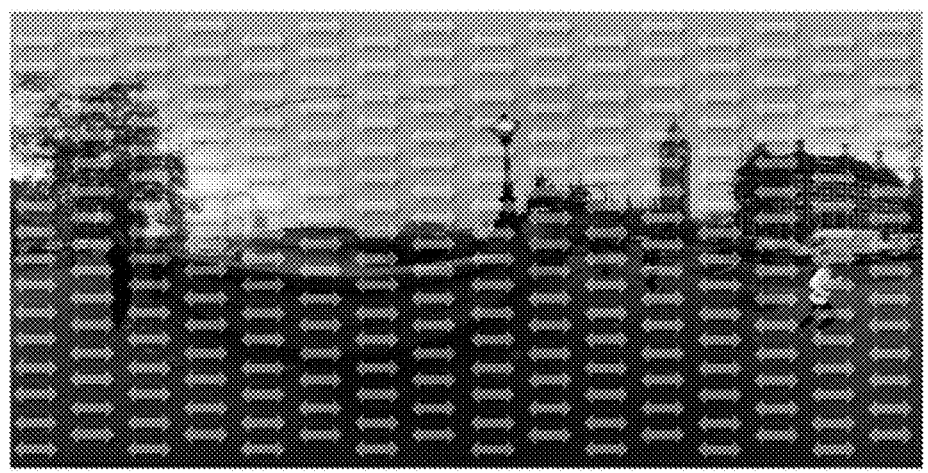
FIGS. 33 to 35 schematically represent the display of panoramic images.
Figure 34:
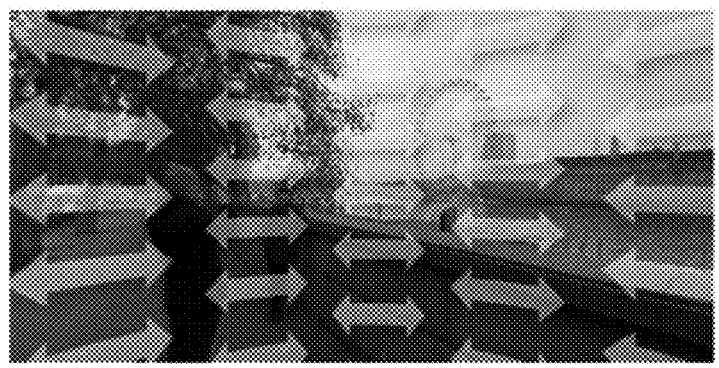
Figure 35:
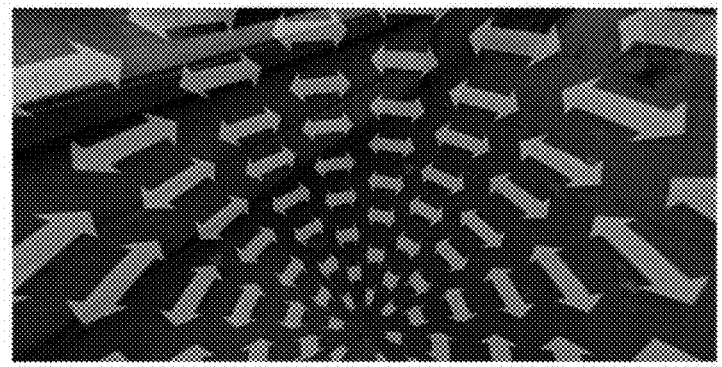

FIGS. 33-35 are schematic images illustrating a potential problem when panoramic images are displayed in a 3D system.

Panoramic stereoscopic content, particularly when it extends beyond a field of view (FOV) of 180°, poses a particular problem for viewing because ideally the parallax should be omnidirectional. Often, however, wide angle or even 360° videos are stored in a so-called "equi-rectangular" format and are then projected onto a virtual spherical screen. The parallax is normally horizontal in this type of image, in a similar manner to conventional 3D content. FIG. 33 provides a schematic illustration of such an image with horizontal parallax.

In the context of such an image projected onto a spherical or part spherical virtual screen (being an example of a non-planar VDS, such as a VDS which is curved so as to at least partially surround the viewer), when the viewer looks horizontally, and their eyes are level, the parallax appears acceptable (as shown in FIG. 34, the parallax being represented schematically by arrows overlaid on the image), although as can be seen in FIG. 34 there can be a vertical component of parallax towards the corners of the displayed portion of the image.

However, a problem arises when the viewer looks up or down. Now, the parallax is in the wrong direction and can even cause the image to appear rotated. An example of this phenomenon is schematically illustrated in FIG. 35.

Figure 36:
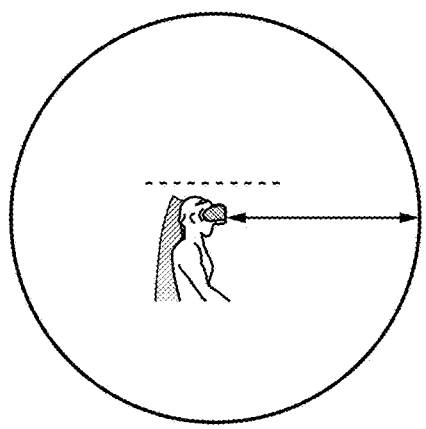
FIG. 36 schematically illustrates a spherical virtual display screen.
Figure 37:
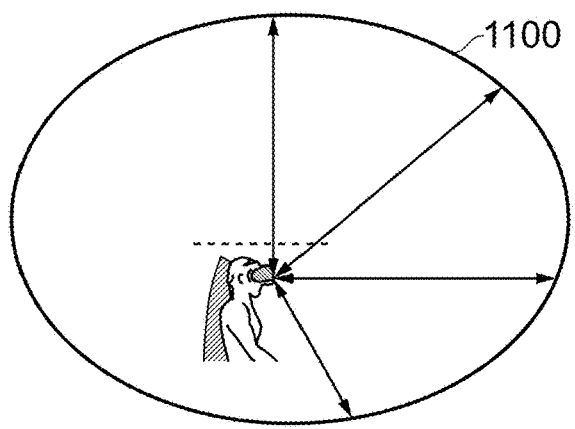
FIG. 37 schematically illustrates a modified virtual display screen.

FIGS. 36 and 37 provide schematic illustrations of one technique for addressing this issue, using the variation of VDS depth discussed above. Instead of applying a spherical virtual screen as in FIG. 36, FIG. 37 shows a virtual display screen position 1100 in which the radial distance from the viewer's head of the VDS varies according to the orientation of the user's head (which is to say, the viewing position relative to the 360° panoramic). The same techniques as those discussed above are used to determine and implement the VDS position appropriate to any particular orientation direction. Assuming the viewer is always at the centre of the virtual display screen (in its spherical form), the screen shape could in fact be a complex shape to match the source image parallax. An example case would be where the source image has no parallax (it is a 2D image) but is mapped onto an exact 3D geometric representation of the objects in the scene. In this case all the depth information would have been transferred from the source image to the scene geometry. A simpler case would be to have a flat ground polygon close to the viewer representing the floor and a large distant dome representing the sky.

Obviously the parallax in the source image would have to be analysed to capture the depth information in order to transfer it to the screen geometry.

Figure 38:
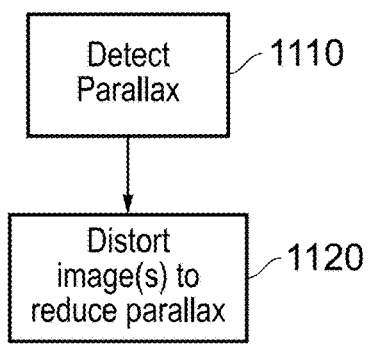
FIG. 38 is a schematic flowchart illustrating an image processing technique.

FIG. 38 is a schematic flow chart illustrating another technique for addressing the issue discussed above in relation to panoramic display.

At a step 1110, parallaxes detected at each portion of that part of the panoramic image which is for display according to a current viewing direction, and at a step 1120 one or both of the left and right images is distorted so as to reduce the parallax in the images for display.

The technique of FIG. 38 does not completely remove the problem discussed above but can reduce it by effectively warping the VDS locally (which is to say, changing the geometry of the VDS locally) so as to reduce net parallax across the image. Depth information such as a depth map can be used to control this process.

In general terms, rather than representing the VDS as a smooth part-sphere or planar surface in virtual space, it could be represented as multiple polygons, with each polygon being treated separately using the processes discussed above. An example involves "warping" the VDS as mentioned above. The VDS can be changed so as to provide different depths for each portion of the VDS. For example, the depth profile of the VDS in respect of a stereoscopic image for display could be set or approximated to the depth profile of objects to be displayed by that stereoscopic image, so that the local depth parameter of the VDS approximated the local depth of the displayed material. This would provide a 3D representation to the viewer without (or involving a reduction in) the problems of incorrect parallax as discussed above. These techniques provide examples of the setting step comprising setting a local radial depth for a portion of the VDS according to a depth parameter of a portion of the stereoscopic image for display by that portion of the VDS, and/or of the setting step comprising setting two or more different local radial depths for respective portions of the VDS according to respective depth parameters of respective portions of the stereoscopic image for display by the corresponding portion of the VDS.

Obviously, numerous modifications and variations of the present disclosure are possible in light of the above teachings. It is therefore to be understood that within the scope of the appended claims, the disclosure may be practised otherwise than as specifically described herein.

It will be appreciated that data signals generated by the variants of apparatus discussed above, and storage or transmission media carrying such signals, are considered to represent embodiments of the present disclosure.

Where methods of processing are discussed above, it will be appreciated that apparatus configured to perform such methods are also considered to represent embodiments of the disclosure. It will also be appreciated that video storage, transmission, capture and/or display apparatus incorporating such techniques is considered to represent an embodiment of the present disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

Respective embodiments are defined by the following numbered clauses:

1. A method of operation of a head mountable display (HMD) system in which stereoscopic images are displayed with respect to a virtual display screen (VDS) position, the method comprising the steps of:

setting a VDS position for a stereoscopic image for display in response to a depth parameter of a region of interest (ROI) in respect of the stereoscopic image for display; and generating the stereoscopic image for display having image parallax appropriate to the VDS position set by the setting step.

2. A method according to clause 1, in which the setting step comprises:

setting the VDS position for the stereoscopic image for display to be substantially equal to the depth represented by a depth parameter of the region of interest (ROI) in respect of the stereoscopic image for display.

3. A method according to clause 1 or clause 2, in which the generating step comprises:

rendering the stereoscopic image for display having image parallax appropriate to the VDS position set by the setting step.

4. A method according to clause 1 or clause 2, in which the generating step comprises:

image-shifting portions of a stereoscopic image to generate the stereoscopic image for display.

5. A method according to any one of the preceding clauses, comprising the step of:

detecting image content of the stereoscopic image for display so as to detect an ROI in respect of the stereoscopic image for display.

6. A method according to any one of clauses 1 to 4, comprising the step of:

detecting a viewer gaze direction in respect of a preceding displayed stereoscopic image so as to detect an ROI in respect of the stereoscopic image for display.

7. A method according to any one of clauses 1 to 4, comprising the step of:

detecting the depth parameter from metadata accompanying the stereoscopic image for display.

8. A method according to any one of the preceding clauses, in which the VDS is non-planar.

9. A method according to clause 8, in which the VDS is curved so as to at least partially surround the viewer.

10. A method according to clause 8 or clause 9, in which the setting step comprises setting a local radial depth for a portion of the VDS according to a depth parameter of a portion of the stereoscopic image for display by that portion of the VDS.

11. A method according to clause 10, in which the setting step comprises setting two or more different local radial depths for respective portions of the VDS according to respective depth parameters of respective portions of the stereoscopic image for display by the corresponding portion of the VDS.

12. Computer software which, when executed by a computer, causes the computer to carry out the method of any one of the preceding clauses.

13. A non-transitory machine-readable storage medium which stores computer software according to clause 12.

14. A head mountable display (HMD) system in which stereoscopic images are displayed with respect to a virtual display screen (VDS) position, the system comprising:
an image processor configured to set a VDS position for a stereoscopic image for display in response to a depth parameter of a region of interest (ROI) in respect of the stereoscopic image for display and to generate the stereoscopic image for display having image parallax appropriate to the VDS position set by the image processor.

15. An HMD system according to clause 14, comprising a display arrangement configured to display the generated stereoscopic image to a wearer of the HMD.

16. A stereoscopic video signal having associated metadata defining a virtual display screen position for use in respect of subsets of frames of the stereoscopic video signal.

We claim:

1. A method of operation of a head mountable display (HMD) system in which a stereoscopic image formed by a first image and a second image is displayed with respect to a virtual display screen (VDS) position for the stereoscopic image, the method comprising the steps of:
setting, by one or more processors including at least one of an image processor and a display controller, a VDS position for a panoramic stereoscopic image for display in response to a depth parameter of a region of interest (ROI) in respect of the stereoscopic image for display, in which the VDS position is determined based on a displacement between a position of the first image and a position of the second image, and a radial distance of the VDS from the head of a viewer of the HMD varies according to an orientation of the viewer's head; and
generating, by one or more processors including at least the display controller, the stereoscopic image for display having an image parallax appropriate to the VDS position set by the setting step.

2. A method according to claim 1, in which the setting step comprises:
setting the VDS position for the stereoscopic image for display to be substantially equal to a depth represented by the depth parameter of the region of interest (ROI) in respect of the stereoscopic image for display.

3. A method according to claim 1, in which the generating step comprises:
rendering the stereoscopic image for display having the image parallax appropriate to the VDS position set by the setting step.

4. A method according to claim 1, in which the generating step comprises:
image-shifting portions of a first stereoscopic image to generate the stereoscopic image for display.

5. A method according to claim 1, further comprising the step of:
detecting image content of the stereoscopic image for display so as to detect the ROI in respect of the stereoscopic image for display.

6. A method according to claim 1, further comprising the step of:
detecting a viewer gaze direction in respect of a preceding displayed stereoscopic image so as to detect the ROI in respect of the stereoscopic image for display.

7. A method according to claim 1, further comprising the step of:
detecting the depth parameter from metadata accompanying the stereoscopic image for display.

8. A method according to claim 1, in which the VDS is non-planar.

9. A method according to claim 8, in which the VDS is curved so as to at least partially surround the viewer.

10. A method according to claim 8, in which the setting step comprises setting a local radial depth for a portion of the VDS according to a depth parameter of a portion of the stereoscopic image for display by the portion of the VDS.

11. A method according to claim 10, in which the setting step comprises setting two or more different local radial depths for respective portions of the VDS according to respective depth parameters of respective portions of the stereoscopic image for display by the corresponding portion of the VDS.

12. A non-transitory machine-readable storage medium that stores computer instructions thereon, the instructions, when executed by a computer including one or more processors including at least one of an image processor and a display controller, cause the computer to carry out a method of operation of a head mountable display (HMD) system in which a stereoscopic image formed by a first image and a second image is displayed with respect to a virtual display screen (VDS) position for the stereoscopic image, the method comprising the steps of:
setting, by at least one of the image processor and the display controller a VDS position for a panoramic stereoscopic image for display in response to a depth parameter of a region of interest (ROI) in respect of the stereoscopic image for display, in which the VDS position is determined based on a displacement between a position of the first image and a position of the second image, and a radial distance of the VDS from the head of a viewer of the HMD varies according to an orientation of the viewer's head; and
generating, by one or more processors including at least the display controller, the stereoscopic image for display having an image parallax appropriate to the VDS position set by the setting step.

13. A head mountable display (HMD) system in which a stereoscopic image formed by a first image and a second image is displayed with respect to a virtual display screen (VDS) position for the stereoscopic image, the system comprising an image processor and a display controller:
at least one of the image processor and the display controller being configured to set a VDS position for a panoramic stereoscopic image for display in response to a depth parameter of a region of interest (ROI) in respect of the stereoscopic image for display, in which the VDS position is determined based on a displacement between a position of the first image and a position of the second image, and a radial distance of the VDS from the head of a viewer of the HMD varies according to an orientation of the viewer's head; and at least the display controller being configured to generate the stereoscopic image for display having an image parallax appropriate to the VDS position set by the image processor.

14. An HMD system according to claim 13, further comprising a display arrangement operatively coupled to the image processor, the display arrangement being configured to display the generated stereoscopic image to a wearer of the HMD.

* * * * *